(12) United States Patent
Ogasawara

(10) Patent No.: US 7,756,412 B2
(45) Date of Patent: Jul. 13, 2010

(54) LIGHT EMISSION CONTROL CIRCUIT OF FLASH DEVICE

(75) Inventor: Akira Ogasawara, Kawasaki (JP)

(73) Assignee: Nikon Corporation, Tokyo (JP)

( * ) Notice: Subject to any disclaimer, the term of this patent is extended or adjusted under 35 U.S.C. 154(b) by 508 days.

(21) Appl. No.: 11/709,226

(22) Filed: Feb. 22, 2007

(65) Prior Publication Data
US 2007/0201856 A1 Aug. 30, 2007

(30) Foreign Application Priority Data
Feb. 28, 2006 (JP) ............................. 2006-052187

(51) Int. Cl.
*G03B 15/03* (2006.01)
(52) U.S. Cl. ...................... 396/159; 396/164
(58) Field of Classification Search ................ 396/159, 396/155, 161, 164; 356/402
See application file for complete search history.

(56) References Cited

U.S. PATENT DOCUMENTS 6,571,062 B2   5/2003   Ogasawara

FOREIGN PATENT DOCUMENTS

JP   2001-222047   8/2001

*Primary Examiner*—Christopher Mahoney
(74) *Attorney, Agent, or Firm*—Staas & Halsey LLP

(57) ABSTRACT

An optical sensor receives light of a light emitting tube. A photoelectric current output from the optical sensor is integrated by a capacitor. A stop signal output part compares the generated voltage of the capacitor with a comparison voltage and outputs a light emission stop signal when the generated voltage exceeds the comparison voltage. A voltage setting part predicts, from target amount of light, an amount of overrun light from when the light emission stop signal is output until when light emission of the light emitting tube terminates and sets the comparison voltage so that a total amount of light emission including the amount of overrun light is a target amount of light emission.

5 Claims, 5 Drawing Sheets

(a)

FULL LIGHT EMISSION WAVEFORM

TIME (b)

STOP

A PART
B PART
OVERRUN LIGHT EMISSION
LIGHT EMISSION WAVEFORM t1     TIME (c)

STOP

A PART
B PART
OVERRUN LIGHT EMISSION
LIGHT EMISSION WAVEFORM t1     TIME

LIGHT EMISSION CONTROL CIRCUIT OF FLASH DEVICE

CROSS REFERENCE TO RELATED APPLICATION

This application is based upon and claims the benefit of priority from Japanese Patent Application No. 2006-052187, filed on Feb. 28, 2006, the entire contents of which are incorporated herein by reference.

BACKGROUND OF THE INVENTION

1. Field of the Invention

The present invention relates to a light emission control circuit of a flash device.

2. Description of the Related Art

In the prior art, the digital control has been performed such that an amount of light emission including an amount of overrun light will be a target amount of light by predicting an amount of remaining light (an amount of overrun light) from when light emission of a flash device terminates until when the actual light emission terminates (refer to patent document 1).

[Patent document 1] U.S. Pat. No. 6,571,062 (Japanese Unexamined Patent Application Publication No. 2001-222047, filed in Japan)

In this prior art, a digital photometric circuit to count the amount of light in pulses is used in a measurement circuit of the amount of light. Because of this, there has been a room for the improvement in that the circuit becomes complex and expensive.

SUMMARY OF THE INVENTION

An object of the present invention is to provide a light emission control circuit of a flash device that properly controls a total amount of light emission including an amount of overrun light while using a simple and inexpensive photometric circuit.

The present invention will be explained below.

<<1>> The light emission control circuit of the present invention has an optical sensor, a capacitor, a stop signal output part, and a voltage setting part.

The optical sensor receives light of light emission from a light emitting tube.

The capacitor integrates a photoelectric current output from the optical sensor.

The stop signal output part compares a generated voltage of the capacitor with a comparison voltage and outputs a light emission stop signal when the generated voltage exceeds the comparison voltage.

The voltage setting part predicts the amount of overrun light from when the light emission stop signal is output until when the light emission of the light emitting tube terminates from a target amount of light emission. The voltage setting part sets the comparison voltage so that the total amount of light emission including the amount of overrun light is the target amount of light.

<<2>> Preferably, the target amount of light is defined by a ratio to an amount of full light emission.

<<3>> Preferably, a correction table and a multiplication part are provided.

The correction table stores a correction coefficient of the comparison voltage using the above-mentioned ratio as an input parameter.

The operation part finds an uncorrected comparison voltage by multiplying the generated voltage of the capacitor at the time of full light emission and the ratio. The operation part finds the above-mentioned comparison voltage by multiplying the uncorrected comparison voltage and the correction coefficient obtained from the correction table.

<<4>> Preferably, a capacitor the capacitance of which can be changed is provided as the capacitor.

For example, the capacitor includes a plurality of capacitor elements, a selection part, and a connection part.

The selection part selects at least one capacitor element from the plurality of capacitor elements. On the other hand, the connection part connects the selected plurality of the capacitor elements in parallel.

<<5>> Another light emission control circuit of the present invention has an optical sensor, a capacitor, and a stop signal output part.

The optical sensor receives light of light emission from a light emitting tube.

The capacitor integrates a photoelectric current output from the optical sensor.

The stop signal output part compares the generated voltage of the capacitor with the comparison voltage and outputs a light emission stop signal when the generated voltage exceeds the comparison voltage.

In the above configuration, the capacitor has a circuit configuration in which a plurality of series circuits of a capacitor element and a switching element are provided and connected in parallel. By the turning on/off control of the above-mentioned switching element, the total capacitance of the capacitors changes. By the change in the capacitance of the capacitor, the generated voltage of the capacitor is changed and the time until the generated voltage exceeds the comparison voltage is controlled.

Preferably, a switch control part is further provided. The switch control part predicts the amount of overrun light from when the light emission stop signal is output until when the light emission of the light emitting tube terminates from the target amount of light emission. The switch control part controls the turning on/off of the switching element so that the total amount of light including the amount of overrun light is the target amount of light.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Embodiments of the present invention will be described below in detail based on drawings.

<Analog Photometric Circuit>

Figure 1:
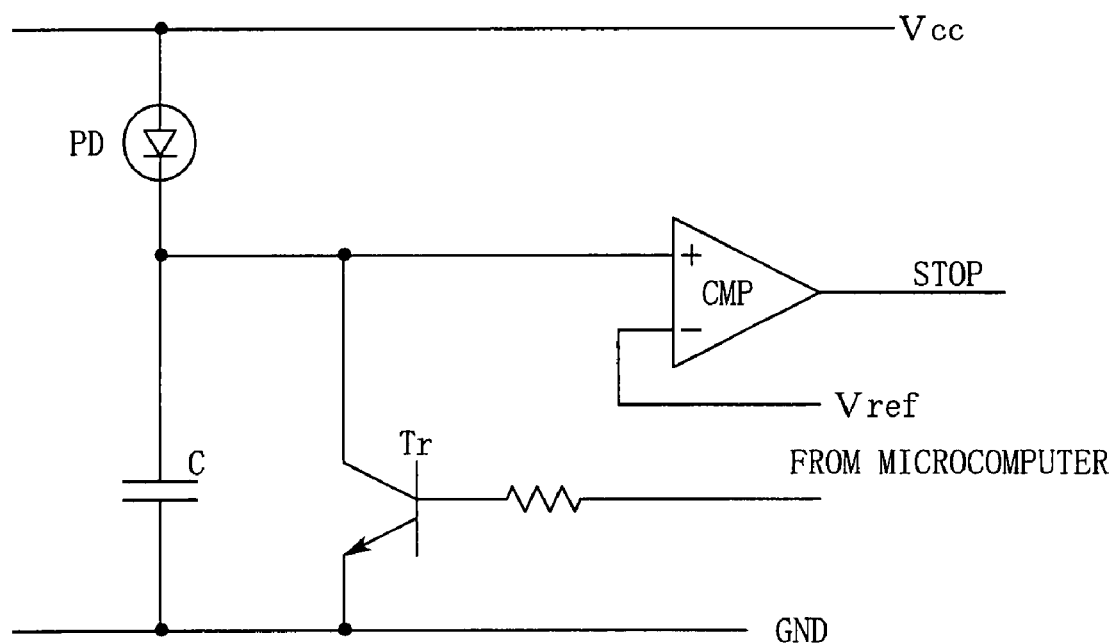
FIG. 1 is a circuit diagram showing the principle of a photometric circuit.

FIG. 1 is a circuit diagram showing the principle of an analog photometric circuit. In FIG. 1, PD is a photodiode and C is a capacitor that integrates a photoelectric current output from the photodiode PD. Tr is a transistor for short circuit of the capacitor C and is turned off at the same time as the start of light emission and charged from the state in which the capacitor is at zero volt by the photoelectric current after light emission. CMP is a comparator. The integrated voltage of the photoelectric current is input to the positive terminal of the comparator CMP and a comparison voltage Vref is input to the negative terminal. After light emission starts, when the voltage of the capacitor C of the photoelectric current exceeds the comparison voltage Vref, a light emission stop signal (STOP) is output.

The circuit shown in FIG. 1 is extremely simple and it is not necessary to integrate the circuit in particular and is also inexpensive. However, since a voltage is applied to the photodiode PD, a leak current is generated. Due to the leak current, the circuit is not suitable for a purpose to measure, for example, a photoelectric current equal to or less than 1 μA. However, in the case of a photometric circuit incorporated in a flash device main body, the influence of a shooting lens is not imposed, and therefore, the amount of received light of the photodiode PD is comparatively large. Because of this, the error caused by the leak current is relatively small and there is no practical problem.

The photometric circuit shown in FIG. 1 transforms the photoelectric current of the photodiode PD into a voltage by the capacitor C and integrates it, and stops the light emission when the integrated value exceeds the comparison voltage Vref.

Here, the voltage of the capacitor C that accumulates the photoelectric current of the photodiode PD is approximately in proportion to the amount of light emission. Consequently, in the case where approximately continuous, arbitrary light emission is caused to occur, it is assumed that the amount of light emission changes linearly with respect to the comparison voltage Vref of the comparator CMP and the comparison voltage Vref with respect to the target amount of light emission is calculated. In other words, it is assumed that when the amount of light emission is halved, the comparison voltage Vref is also halved.

However, based on this assumption, the error becomes greater as the amount of light emission becomes slighter. One of the causes thereof is a phenomenon called overrun light emission (also referred to as light increase) in which light emission continues for a while after the light emission stop signal is output. This is a phenomenon in which a gas in the light emitting tube continues light emission for a while after the current is shut off. Because of this, it is difficult to restrict the overrun light emission.

Figure 2:
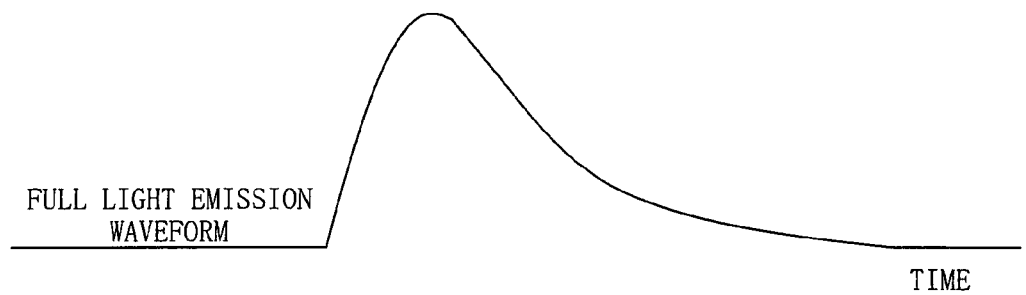
FIG. 2 is a diagram showing the state of overrun light emission or light increase.
Figure 2:
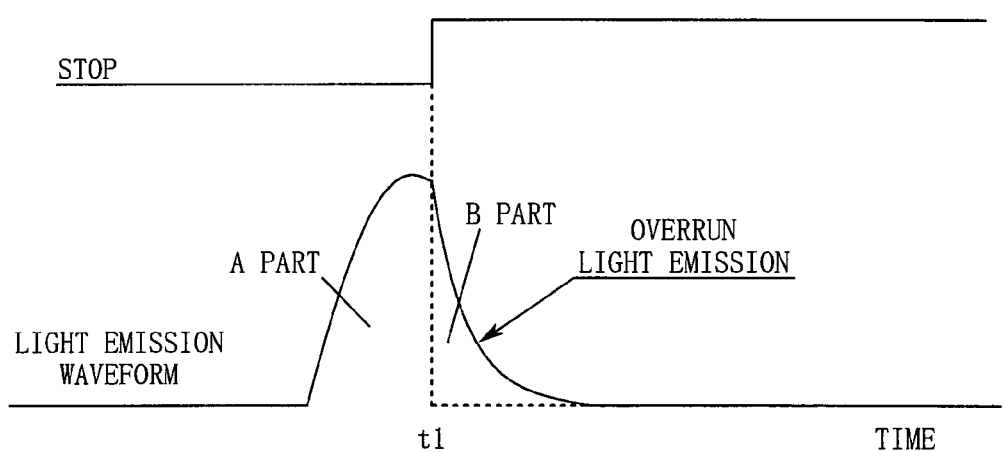
Figure 2:
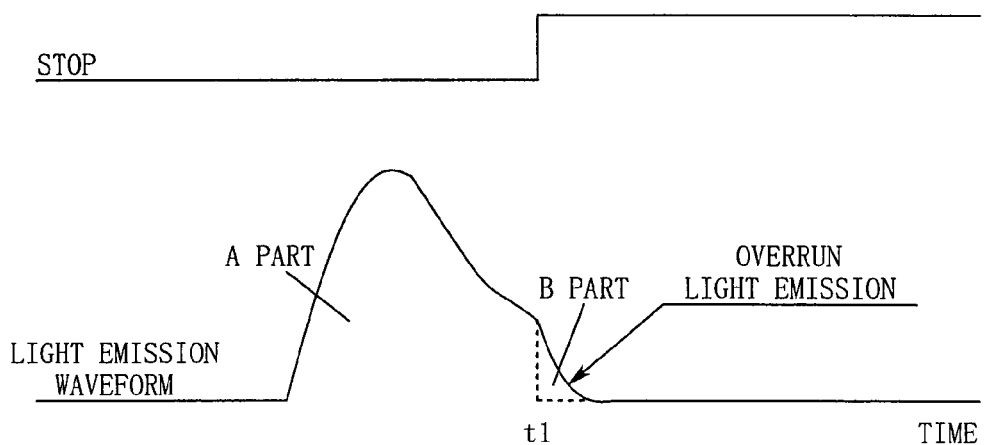

FIG. 2 shows the state of the overrun light emission.

FIG. 2($a$) is a general light emission waveform when a flash device is caused to emit light fully.

As shown in FIG. 2($c$), when the amount of light emission is comparatively large, the overrun light emission that occurs after time t1 is relatively small and this hardly causes a problem.

However, in the case of slight light emission as shown in FIG. 2($b$), the amount of light emission at the time when light emission terminates and the amount of overrun light are substantially the same. Because of this, the control error becomes large.

In the case shown in FIG. 2($b$), an imaging device becomes overexposure and a highlight detail loss occurs in an image.

Figure 3:
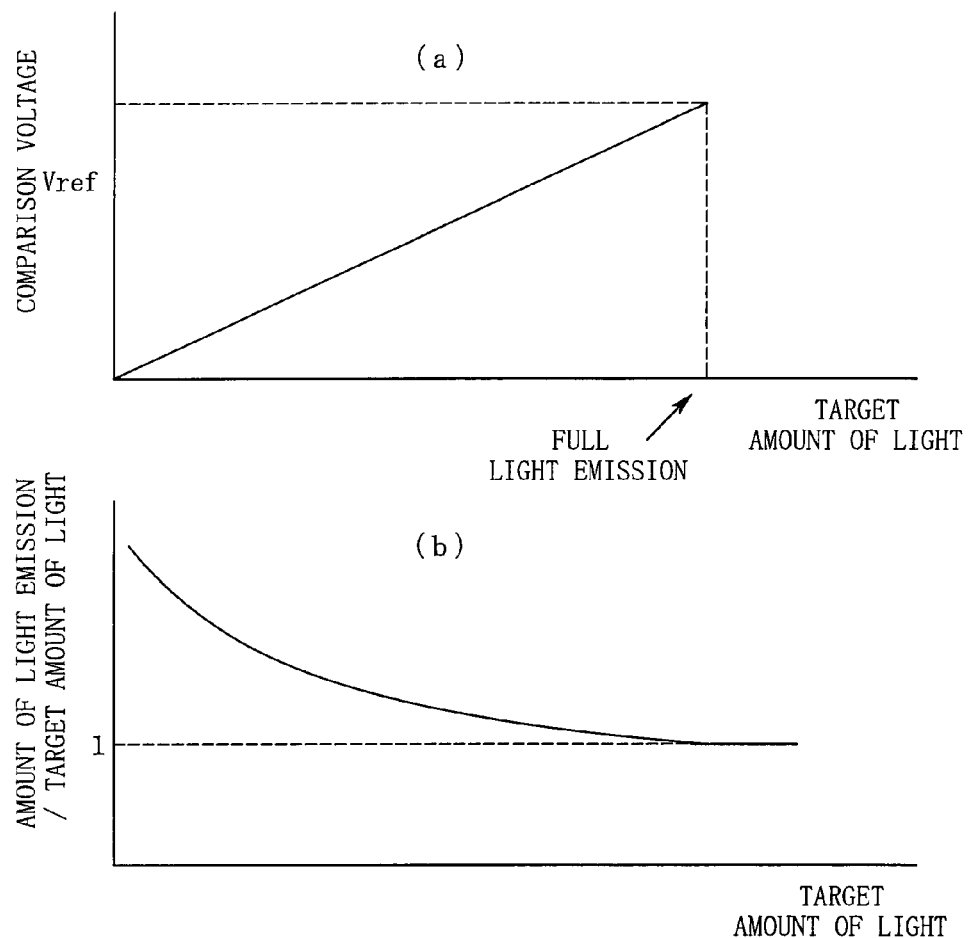
FIG. 3 is a diagram showing the relationship (a) between a target amount of light and a comparison voltage and the relationship (b) between the target amount of light and (the amount of light emission/comparison voltage)

FIG. 3 is a diagram for illustrating the setting of the comparison voltage.

In FIG. 3($a$), the comparison voltage is set in proportion to the target amount of light. In this case, as shown in FIG. 3($b$), the smaller the target amount of light, the more the actual amount of light emission overruns the target amount of light. This phenomenon results from the amount of overrun light described above.

By the way, at the time when the light emission stop signal is output, the generated voltage of the capacitor C is probably substantially the same as the comparison voltage Vref. However, due to the amount of overrun light after that, the generated voltage of the capacitor C increases up to (Vref+Vover). The ratio of Vref to Vover corresponds to the area ratio between A part and B part shown in FIG. 2.

Then, it is possible to find the correction coefficient of the comparison voltage Vref required to obtain the target amount of light by causing the photometric circuit shown in FIG. 1 to control light emission by changing the comparison voltage Vref and by measuring the increased voltage Vover with respect to the comparison voltage Vref. The correction coefficient here is normally less than one because the comparison voltage Vref is suppressed counting on the amount of overrun light.

For example, in the case where the area ratio of A part and B part in FIG. 2 is the same, the correction coefficient is approximately 50%.

By the way, since there is an individual difference between the light emitting tubes, variations may result in the absolute amount of light, such as the amount of full light emission and the amount of overrun light. Because of this, it is necessary to prepare the measurement table of the amount of overrun light for individual light emitting tubes when predicting the amount of overrun light from the target amount of light.

Figure 4:
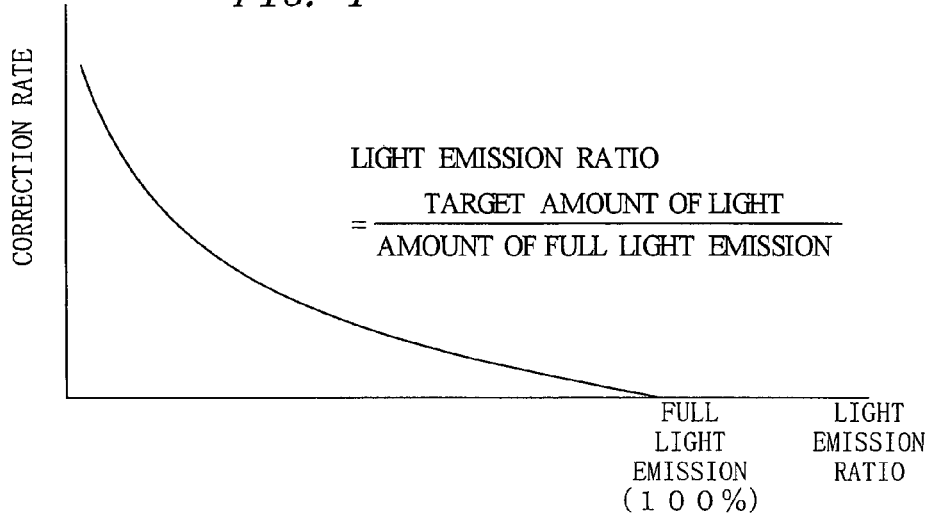
FIG. 4 is a diagram showing an example of a curve of a correction coefficient when the target amount of light/amount of full light emission (light emission ratio) is taken as a parameter.

The problem of the individual difference can be solved by normalizing the target amount of light by the amount of full light emission for the individual light emitting tubes. In other words, it is possible to create a data table with slight individual differences by storing in association with the correction coefficient of the comparison voltage Vref using the target amount of light/amount of full light emission (hereinafter, referred to as the light emission ratio) as an input parameter. FIG. 4 is a diagram showing an example of the data table.

For example, when it is desired to realize an amount of light one quarter of the amount of full light emission, the uncorrected comparison voltage Vref is found by multiplying the generated voltage of the capacitor C at the time of full light emission by a factor of 1/4. Next, by referring to the data table shown in FIG. 4 using the light emission ratio 1/4 as an input parameter, the correction coefficient can be obtained. Then, it is possible to calculate the comparison voltage Vref after correction by multiplying the uncorrected comparison voltage Vref by the correction coefficient.

If the light emission ratio and the correction coefficient are multiplied in advance and put into a table, only one time multiplication is required.

In addition, there is also a case where the target amount of light is set and input in the absolute amount of light such as a guide number. In order to deal with such a case, it is enough to store the light emission ratio corresponding to the guide number (absolute amount of light) as a data table. In this case, it is possible to transform the guide number (absolute amount of light) into the light emission ratio in the device. Based on the light emission ratio, the comparison voltage Vref can be determined as mentioned above.

<Improvement of Analog Photometric Circuit>

Normally, the correction and setting of the above-described comparison voltage Vref are treated by a microcomputer in the flash device. In this case, the comparison voltage Vref is generated frequently by a DA converter incorporated in a microcomputer or a circuit for low pass processing of the PWM signal. In this case, the bit precision of the comparison voltage Vref is, for example, 8 bits to 10 bits. In actuality, the noise variation of the analog signal line, the voltage variation of the ground line, etc., overlap the bit precision, and therefore, there may be the case where the bit precision of the comparison voltage Vref is about 8 bits. In this state, if the comparison voltage Vref is reduced in accordance with the slight light emission, the bit precision of the comparison voltage Vref, that is, the quantization error, cannot be ignored any longer and the precision of the amount of light emission is interfered with.

On the other hand, due to the variations in the sensitivity of the photodiode PD, the maximum voltage of the capacitor C at the time of full light emission varies. In order to restrict the variations in the maximum voltage to within the dynamic range of the circuit, the capacitance of the capacitor C needs to be designed to have a slightly larger capacitance than required. Consequently, the average maximum voltage of the capacitor C is reduced to, for example, as low as about one quarter of the power supply voltage. Because of this, the comparison voltage Vref at the time of slight light emission is further reduced and the quantization error of the comparison voltage Vref cannot be ignored all the more.

Figure 5:
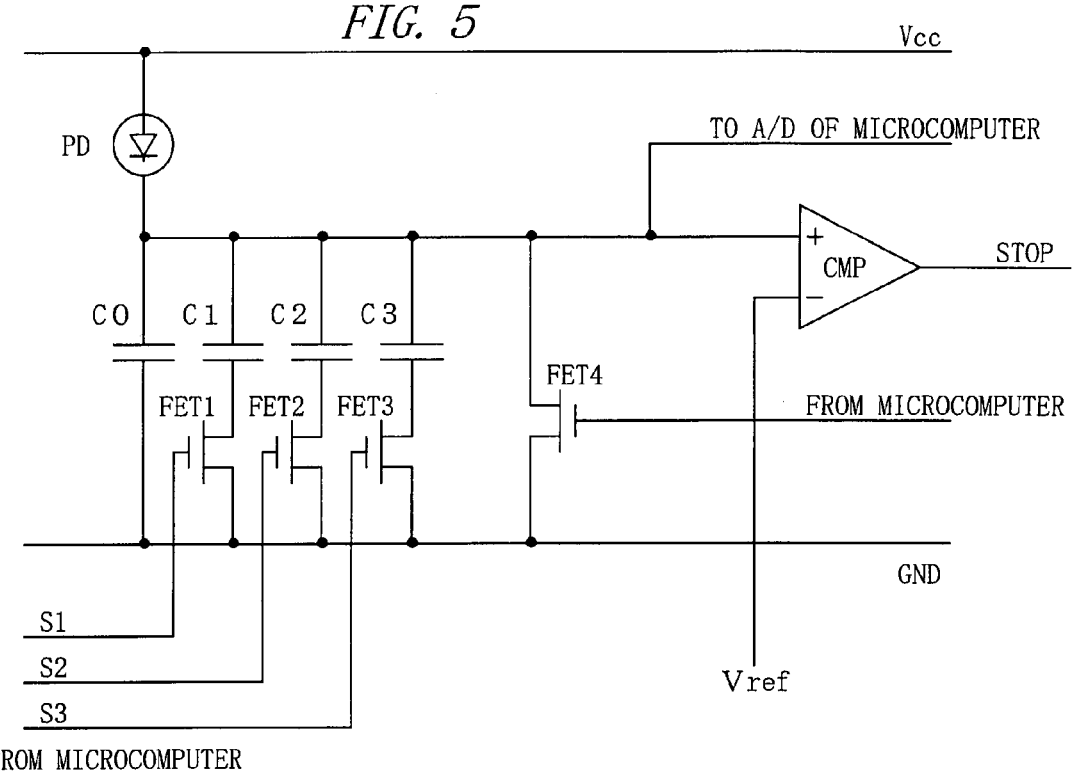
FIG. 5 is a diagram showing another example of a photometric circuit.

Because of these reasons, it is desired to improve the precision at the time of slight light emission. FIG. 5 shows a circuit in which the precision at the time of slight light emission has been improved.

In FIG. 5, the capacitor C in FIG. 1 is replaced with a plurality of capacitors (here, four: C0 to C3) connected in parallel. To the branches of the capacitors C1 to C3, field effect transistors FET1 to FET3 are connected in series. By the way, the capacitor C0 with the minimum capacitance is connected to the photodiode PD fixedly. FET 4 is a switching element for resetting the accumulated charges in the capacitor. Other circuitry parts are the same as those in FIG. 1 and therefore description is omitted here.

The microcomputer in the device changes the capacitance of the capacitor by controlling the turning on/off of the field effect transistors FET1 to FET3 with control signals S1 to S3.

Specifically, the microcomputer reduces the capacitance of the capacitor in accordance with slight light emission. As a result, it is possible to increase the generated voltage of the capacitor. In this case, the value of the comparison voltage Vref increases and the influence of the quantization error decreases. As a result, it is possible to improve the precision at the time of slight light emission.

In contrast to this, at the time of a large amount of light emission, the microcomputer increases the capacitance of the capacitor. As a result, it is possible to reduce the generated voltage of the capacitor. In this case, even if the sensitivity of the photodiode PD varies, it becomes unlikely that the generated voltage of the capacitor exceeds the dynamic range of the circuit.

Because of the above reasons, the operation margin of the circuit can be widened while improving the precision of the slight light emission.

By the way, in order to further enhance the above-mentioned effect, it is preferable to set the steps of the capacitance of the capacitor to a fixed ratio. For example, by making the ratio of the capacitance of the capacitors C0 to C3 geometric progressive, such as 1:4: 16:64, it is possible to change the combined capacitance at a fixed ratio.

In the circuit in FIG. 5 also, the basic calculation method of the comparison voltage Vref is the same as that in the circuit of FIG. 1. However, since the capacitance of the capacitor varies, it is necessary to adjust the comparison voltage Vref. In general, it is recommended for the microcomputer to adjust the comparison voltage Vref so as to be in inverse proportion to the capacitance of the capacitor. By the way, the capacitance of the capacitor may be determined on condition that the comparison voltage Vref after adjustment falls within a proper voltage range.

Figure 6:
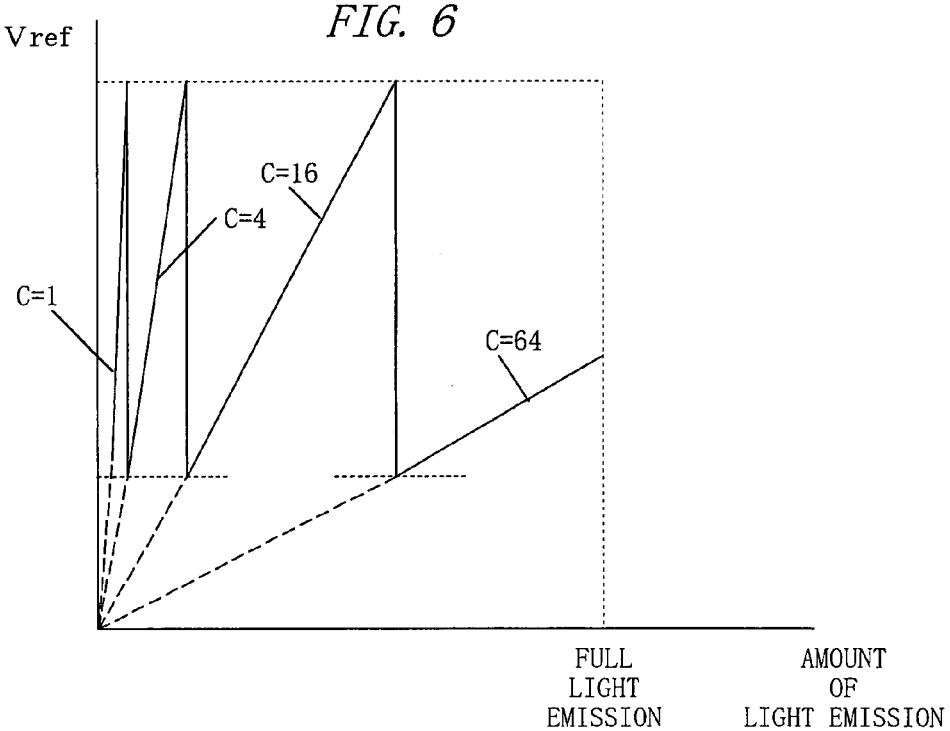
FIG. 6 is a diagram showing an example of a state of photometric range switching of the photometric circuit shown in FIG. 5.

FIG. 6 is a diagram showing an example of the photometric range switching of the photometric circuit shown in FIG. 5. The capacitance of the capacitor is assumed to be 1:4: 16:64. The generated voltage Vfull when full light emission is caused to occur with a capacitor capacitance ratio of 64 (displayed as C=64) varies depending on the individuals. Because of this, it cannot be known until light emission is caused to occur actually how large it is with respect to the maximum value of the comparison voltage Vref of the comparator CMP, and it is premised that adjustment is unavailable after that and adjustment is made in no way.

FIG. 6 shows the case where Vfull becomes a voltage of about 50% thereof with respect to the variable range of the comparison voltage Vref. When the calculation result of multiplication of the ratio of amount of light with respect to the full light emission of the target amount of light and the overrun light emission correction coefficient falls below the range switching threshold value of Vref, the capacitance of the capacitor is switched sequentially so that the calculation result falls within the target range. When the capacitance of the capacitor is set to a minimum, the result will be accepted even if it falls below the range switching threshold value of the comparison voltage Vref. It can be understood from FIG. 6 that the setting voltage of the comparison voltage Vref can be set to a voltage much larger than the case where the capacitor is one even if the amount of light becomes small.

For the capacitor for photoelectric current voltage transformation, a normal electronic part is used. However, the capacitance varies and because of the cost, usually, a part exhibiting about 10% of variation is used. Consequently, if the operation of the range conversion is performed based on the nominal value of the part capacitance, an error will occur. In order to correct this, a method is available, in which the capacitance of the capacitor is actually measured in advance and the actual conversion coefficient of each range is calculated from the measurement and stored. However, it is difficult to perform the above-mentioned process in the manufacture line because it takes too much man-hours. Practically, it is recommended to set the comparison voltage Vref to cause light emission suitable for the range to occur in each photometric range and measure the amount of light by a flash meter and at the same time, to measure the voltage of the capacitor. Since the voltage of capacitor/amount of light exposure is in proportion to the capacitance of the capacitor, it is possible to calculate the photometric sensitivity between the actual ranges from the rate (voltage of capacitor/amount of light exposure) for each range. By storing this, the comparison voltage Vref can be correctly calculated in each range.

<TTL Light Adjustment Control Utilizing Monitor Light Emission>

Finally, an example of the sequence of the TTL light adjustment control utilizing the monitor light emission will be described. In this example, a digital camera of single-lens reflex type is supposed and it is possible to exchange a large quantity of information between the camera and its flash device by serial communication by exchanging signals via a connection terminal called a shoe.

Figure 7:
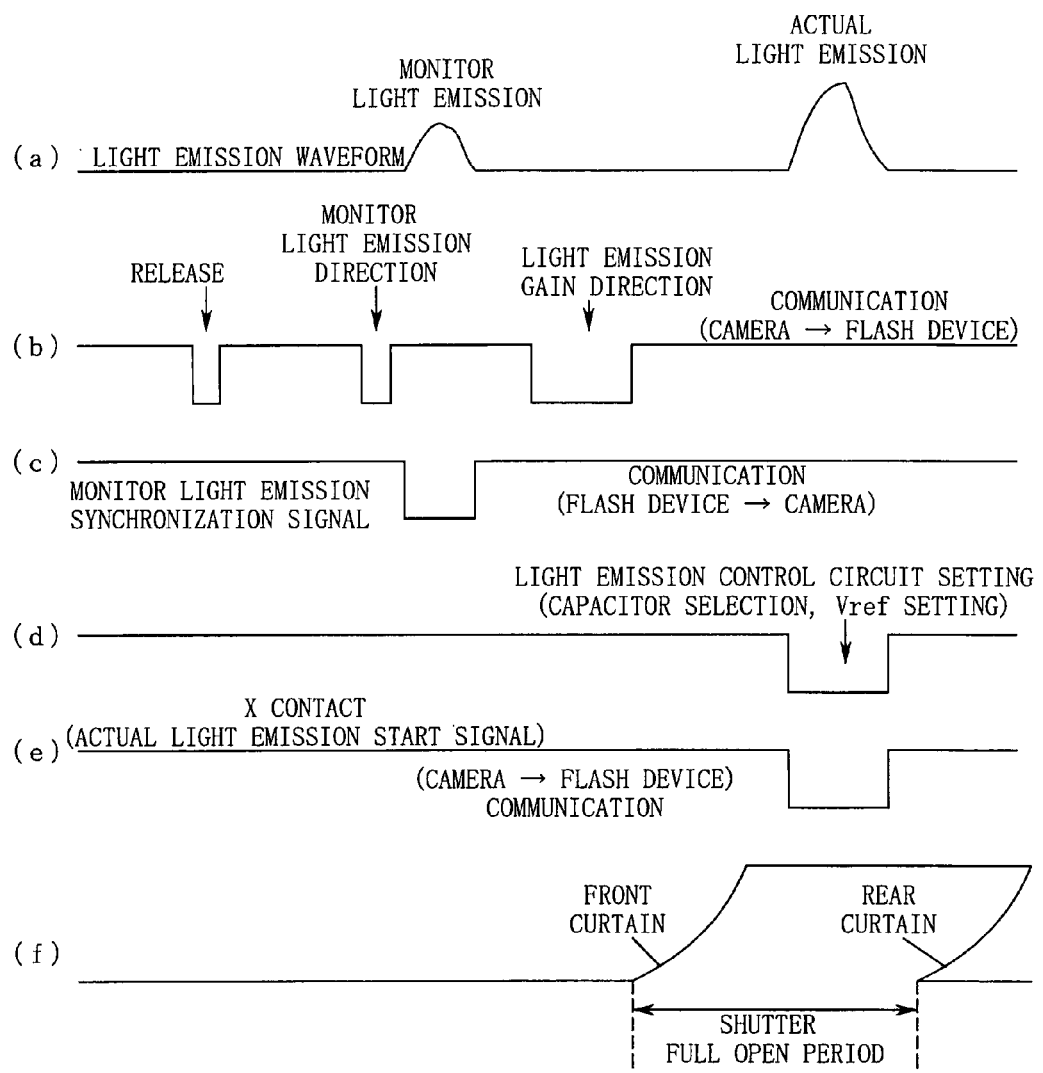
FIG. 7 is a sequence diagram between a camera and a flash device.

FIG. 7 is a sequence diagram between the camera and the flash device. When a photographer presses the release button of the camera, the camera first notifies the flash device of the start of the photographing sequence. Following this, the camera notifies the flash device to cause monitor light emission to occur. Whether the monitor light emission is caused to occur with the aperture of the photographing lens kept open or whether the monitor light emission is caused to occur after the aperture is reduced to one for photographing depends on the system. The utilization of a photometric sensor results in full-aperture metering before mirror-up, however, when stop-down metering is executed, it is required to provide a photometric sensor dedicated to the flash device at the body bottom. In this case, it is recommended to increase the reflectivity of the surface of the shutter curtain (on the side of the lens) to increase the photometric performance by coating with as bright a paint as possible. The monitor light emission by the stop-down metering has an advantage that the photographer does not feel that the flash device flashes twice because no influence of the aperture error of the lens is imposed and the time interval between the monitor light emission and the actual light emission is small.

There is a degree of freedom as to whether the camera or the flash device determines the start of monitor light emission, and the monitor light emission can be started by a light emission activation command signal of the camera, or by a start notification signal from the flash device side. In either case, it is necessary for both the camera and the flash device to meter the monitor light emission. Due to this, in the sequence shown in FIG. 7, the flash device outputs the period of monitor light emission to the camera as a monitor light emission synchronization signal.

The camera measures a subject image illuminated by the monitor light emission with a photometric sensor. On the other hand, the flash device measures the light emission discharged by a light emitting tube (xenon tube). The camera detects the exposure data of an image and the flash device detects the absolute amount of light emission corresponding to this, as a result. It is assumed that the amount of light emission of monitor light emission is determined in advance and the comparison voltage of the light adjustment control circuit for outputting the amount of light is adjusted and stored.

Further, after the monitor light emission, it is possible to measure the actual amount of monitor light emission by measuring the voltage of the capacitors C, C0, etc., of the photometric circuit shown in FIG. 1 or FIG. 5. After the monitor light emission, the camera measures the photometric voltage and calculates the amount of light of the flash device necessary for photographing. This calculation is, in principle, found as a ratio to the amount of monitor light emission. The camera immediately transmits the calculated information to the flash device as a light emission gain. The flash device, which has received the light emission gain, calculates and sets the comparison voltage Vref of the photometric circuit that has taken into consideration the correction of the amount of overrun light emission by the method described above in order to realize the actual amount of light emission calculated from the received light emission gain and the amount of monitor light emission.

By the way, the actual amount of light emission obtained by multiplying the amount of monitor light emission (the voltage of the capacitor) by the light emission gain is obtained by calculating the ratio to the voltage of the capacitor at the full light emission stored in advance, taking into consideration also the sensitivity ratio of the photometric range at the time of the monitor light emission control, and calculating the comparison voltage Vref to be set by selecting a correction amount from the correction table of overrun using this ratio as a parameter. Further, the selection of the photometric range suitable for the actual light emission control and the setting of the Vref are executed. After this, when the front curtain of the shutter curtain finishes traveling, the actual light emission start signal is output from the camera to the flash device and the actual light emission in synchronization with light exposure is caused to occur.

In the above description, an example of the digital camera of single-lens reflex type is described, however, the present invention is not limited to this, and can be widely applied to a digital camera of compact type equipped with a flash device etc.

The invention is not limited to the above embodiments and various modifications may be made without departing from the spirit and scope of the invention. Any improvement may be made in part or all of the components.

What is claimed is:

1. A light emission control circuit of a flash device, comprising:
   an optical sensor that receives light of light emission from a light emitting tube;
   a capacitor that integrates a photoelectric current output from said optical sensor;
   a stop signal output part that compares a generated voltage of said capacitor with a comparison voltage and outputs a light emission stop signal when said generated voltage exceeds said comparison voltage; and
   a voltage setting part that predicts, from a target amount of light of light emission, an amount of overrun light from when said light emission stop signal is output until when light emission of said light emitting tube terminates and sets said comparison voltage so that a total amount of light emission including said amount of overrun light is a target amount of light.

2. The light emission control circuit of a flash device according to claim 1,
   wherein said target amount of light is defined by a ratio to an amount of full light emission.

3. The light emission control circuit of a flash device according to claim 2, comprising:
   a correction table that stores a correction coefficient of a comparison voltage as an input parameter of said ratio; and
   an operation part that finds an uncorrected comparison voltage by multiplying the generated voltage of said capacitor at the time of full light emission and said ratio to obtain said comparison voltage by multiplying said uncorrected comparison voltage and the correction coefficient obtained from said correction table.

4. The light emission control circuit of a flash device according to claim 1,
   wherein said capacitor includes:
   a plurality of capacitor elements;
   a selection part that selects at least one capacitor element from said plurality of capacitor elements; and a connection part that connects in parallel a plurality of capacitor elements selected by the selection part.

5. A light emission control circuit of a flash device, comprising:

an optical sensor that receives light of light emission from a light emitting tube;

a capacitor that integrates a photoelectric current output from said optical sensor; and a stop signal output part that compares a generated voltage of said capacitor with a comparison voltage and outputs a light emission stop signal when said generated voltage exceeds said comparison voltage, wherein said capacitor has a configuration in which a plurality of series circuits of a capacitor element and a switching element are provided and are connected in parallel, and controls a time until the generated voltage of said capacitor exceeds said comparison voltage by changing the capacitance of said capacitor by the turning on/off control of said switching element.

* * * * *